(12) United States Patent
Lee et al.

(10) Patent No.: US 12,478,097 B2
(45) Date of Patent: Nov. 25, 2025

(54) AEROSOL GENERATING DEVICE

(71) Applicant: KT&G CORPORATION, Daejeon (KR)

(72) Inventors: Won Kyeong Lee, Gyeonggi-do (KR); Jae Sung Choi, Gyeonggi-do (KR); Heon Jun Jeong, Seoul (KR)

(73) Assignee: KT&G Corporation, Daejeon (KR)

( * ) Notice: Subject to any disclaimer, the term of this patent is extended or adjusted under 35 U.S.C. 154(b) by 173 days.

(21) Appl. No.: 17/796,105

(22) PCT Filed: Jan. 19, 2022

(86) PCT No.: PCT/KR2022/000965
§ 371 (c)(1),
(2) Date: Jul. 28, 2022

(87) PCT Pub. No.: WO2022/164115
PCT Pub. Date: Aug. 4, 2022

(65) Prior Publication Data
US 2024/0180241 A1    Jun. 6, 2024

(30) Foreign Application Priority Data

Jan. 26, 2021 (KR) .................. 10-2021-0011024
Mar. 25, 2021 (KR) .................. 10-2021-0038972

(51) Int. Cl.
*A24F 40/10* (2020.01)
*A24F 40/05* (2020.01)
(Continued)

(52) U.S. Cl.
CPC .............. *A24F 40/05* (2020.01); *A24F 40/10* (2020.01); *A24F 40/57* (2020.01); *A24F 40/42* (2020.01); *A24F 40/485* (2020.01); *A24F 40/60* (2020.01)

(58) Field of Classification Search
CPC ................................ A24F 40/10; A24F 40/57
See application file for complete search history.

(56) References Cited

U.S. PATENT DOCUMENTS 12,213,516 B2 *   2/2025  Alshaiba Saleh Ghannam
                           Almazrouei ......... A61M 15/06
2016/0213866 A1   7/2016  Tan
(Continued)

FOREIGN PATENT DOCUMENTS

AU    2022202945 A1    5/2022
CN    206714084 U    12/2017
(Continued)

OTHER PUBLICATIONS

US 11,350,663 B2, 06/2022, Han et al. (withdrawn)
(Continued)

*Primary Examiner* — Russell E Sparks
(74) *Attorney, Agent, or Firm* — Foley & Lardner LLP

(57) ABSTRACT

Disclosed is an aerosol generating apparatus including a liquid storage configured to accommodate an aerosol generating material; a vibrator configured to generate ultrasonic vibration to atomize the aerosol generating material into an aerosol; and a processor configured to, based on a correlation between frequencies within a predetermined range including a resonant frequency of the vibrator and impedances of the vibrator changed by application of the frequencies within the predetermined range, determine an operating frequency for controlling the vibrator to a second temperature higher than a first temperature reached by application of a voltage of the resonant frequency and control the vibrator to the second temperature by applying a voltage of the operating frequency to the vibrator.

8 Claims, 6 Drawing Sheets

(51) Int. Cl.
*A24F 40/57* (2020.01)
*A24F 40/42* (2020.01)
*A24F 40/485* (2020.01)
*A24F 40/60* (2020.01)

(56) References Cited

U.S. PATENT DOCUMENTS

| | | | |
|---|---|---|---|
| 2018/0296777 | A1 | 10/2018 | Terry et al. |
| 2019/0015612 | A1 | 1/2019 | Marmur et al. |
| 2019/0059446 | A1 | 2/2019 | Kessler et al. |
| 2020/0230333 | A1 | 7/2020 | Jones et al. |
| 2021/0197222 | A1* | 7/2021 | Bayat .................. A24F 40/05 |
| 2021/0267280 | A1* | 9/2021 | Zigmund .............. A24F 40/50 |
| 2022/0039480 | A1 | 2/2022 | Cho et al. |
| 2023/0080902 | A1* | 3/2023 | Dittmann .............. A24F 40/05 131/328 |

FOREIGN PATENT DOCUMENTS

| | | |
|---|---|---|
| CN | 112165872 A | 1/2021 |
| JP | 2001-300375 A | 10/2001 |
| JP | 2014-524313 A | 9/2014 |
| JP | 2018-504927 A | 2/2018 |
| KR | 10-1326661 B1 | 11/2013 |
| KR | 10-2018-0070511 A | 6/2018 |
| KR | 10-2019-0022360 A | 3/2019 |
| KR | 10-2020-0100580 A | 8/2020 |
| WO | 2017/076590 A1 | 5/2017 |
| WO | WO-2018/113669 A1 | 6/2018 |
| WO | 2020/194297 A1 | 10/2020 |
| WO | 2021/205158 A1 | 10/2021 |

OTHER PUBLICATIONS

Communication dated Mar. 3, 2023, issued in Korean Application No. 10-2021-0038972.
First Office Action issued in Chinese Application No. 2022800028813 dated Jun. 24, 2024 (9 Pages).
International Search Report of PCT/KR2022/000965 dated May 4, 2022 [PCT/ISA/210].
Written Opinion of PCT/KR2022/000965 dated May 4, 2022 [PCT/ISA/237].
Extended European Search Report dated Sep. 27, 2023 in Application No. 22735755.5.

* cited by examiner (a)

(b)

AEROSOL GENERATING DEVICE

CROSS REFERENCE TO RELATED APPLICATIONS

This application is a National Stage of International Application No. PCT/KR2022/000965, filed Jan. 19, 2022, claiming priorities to Korean Patent Application No. 10-2021-0011024, filed Jan. 26, 2021 and Korean Patent Application No. 10-2021-0038972, filed on Mar. 25, 2021.

TECHNICAL FIELD

The present disclosure relates to an aerosol generating device, and more particularly, to an aerosol generating device capable of generating an aerosol by using ultrasound.

BACKGROUND ART

Recently, demand for alternative methods for overcoming shortfalls of general cigarettes has increased. For example, there is an increasing demand for a method of generating aerosol by heating an aerosol generating material in cigarettes, rather than by burning cigarettes. Accordingly, research on heating type aerosol generating devices or ultrasonic vibration type aerosol generating devices has been actively conducted.

DISCLOSURE

Technical Problem

When an atomization amount (i.e., amount of vapor or smoke) of an aerosol generating device is small, the user's convenience may be improved in terms of environmental restrictions. Meanwhile, when the atomization amount is large, a visual satisfaction may be provided. Therefore, a technique for controlling an atomization amount according to the situation is demanded. Also, since satisfaction may be different depending on the temperature of an aerosol delivered to a user, a technique for controlling the temperature of the aerosol is demanded. Technical problems to be solved are not limited to the technical problems as described above, and other technical problems may be derived from the below embodiments.

Technical Solution

According to an aspect of the present disclosure, an aerosol generating apparatus includes a liquid storage configured to accommodate an aerosol generating material; a vibrator configured to generate ultrasonic vibration to atomize the aerosol generating material into an aerosol; and a processor configured to, based on a correlation between frequencies within a predetermined range including a resonant frequency of the vibrator and impedances of the vibrator changed by application of the frequencies within the predetermined range, determine an operating frequency for controlling the vibrator to a second temperature higher than a first temperature reached by application of a voltage of the resonant frequency and control the vibrator to the second temperature by applying a voltage of the operating frequency to the vibrator.

Advantageous Effects

As described above, in an aerosol generating apparatus using an ultrasonic vibrator, the vibrator is maintained in a pre-heated state to lower the viscosity of an aerosol generating material even while a user is not performing a puff. Thus, the aerosol generating material having the low viscosity may be quickly atomized into an aerosol when the vibrator is switched to an atomization operation according to a puff of the user, thereby providing a uniform amount of atomization to the user.

BEST MODE

Figure 1:
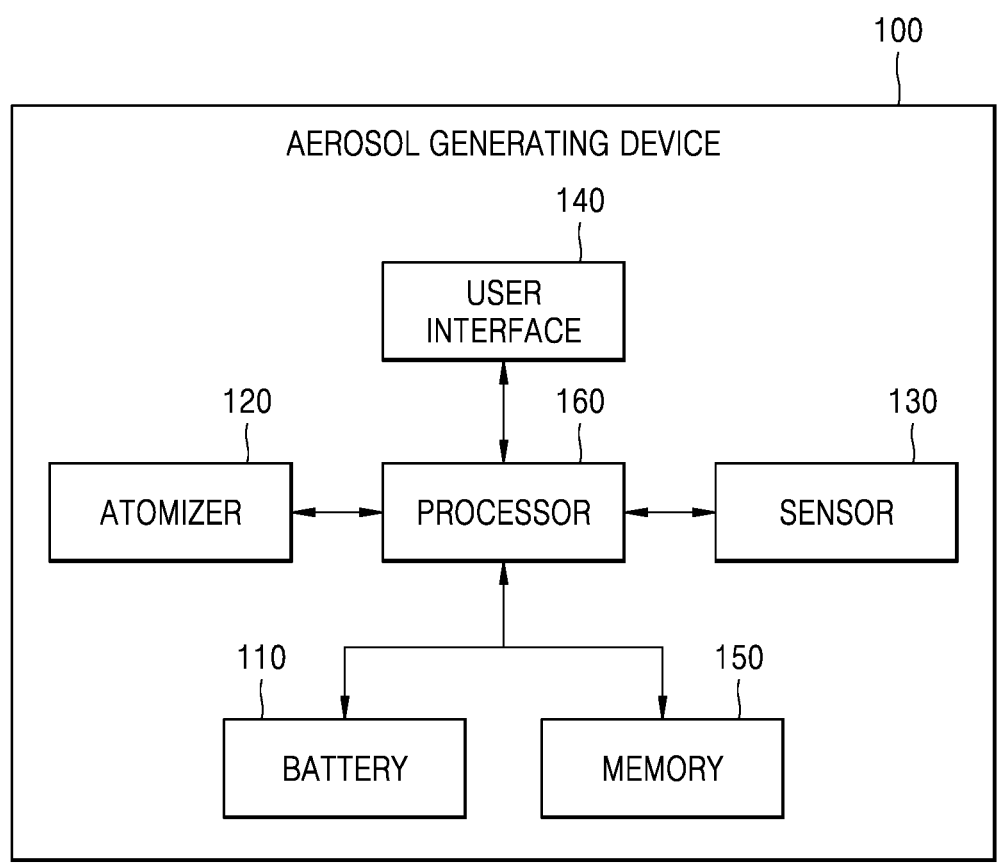
FIG. 1 is a block diagram of an aerosol generating device according to an embodiment.

According to an aspect of the present disclosure, an aerosol generating apparatus includes a liquid storage configured to accommodate an aerosol generating material; a vibrator configured to generate ultrasonic vibration to atomize the aerosol generating material into an aerosol; and a processor configured to, based on a correlation between frequencies within a predetermined range including a resonant frequency of the vibrator and impedances of the vibrator changed by application of the frequencies within the predetermined range, determine an operating frequency for controlling the vibrator to a second temperature higher than a first temperature reached by application of a voltage of the resonant frequency and control the vibrator to the second temperature by applying a voltage of the operating frequency to the vibrator.

Also, the vibrator may transfer heat generated at the second temperature to an aerosol generating material, which is moved from the liquid storage and is absorbed by a liquid delivery element, such that the temperature of an absorbed aerosol generating material reaches a temperature corresponding to the second temperature.

Also, a viscosity of the absorbed aerosol generating material may decrease as a temperature of the absorbed aerosol generating material increases, and the vibrator may be further configured to atomize the aerosol generating material having a reduced viscosity as the aerosol generating material is controlled to the second temperature as compared to the case where the vibrator is controlled to the first temperature, and generate a greater amount of aerosol per unit time from the aerosol generating material having the reduced viscosity as compared to the case where the vibrator is controlled to the first temperature.

Also, as the vibrator is controlled to the second temperature, the impedance of the vibrator may increase as compared to the case where the vibrator is controlled to the first temperature, and, when an amount of an aerosol generated for a unit time is increased by a first value due to the temperature of the vibrator increased in correspondence to the increased impedance of the vibrator and an amount of aerosol generated for the unit time is decreased by a second value due to the vibration energy of the vibrator decreased in correspondence to the increased impedance of the vibrator, the processor may determine the second temperature, such that the first value exceeds the second value.

Also, a particle size of an aerosol atomized from the aerosol generating material having the reduced viscosity may be 0.2 µm to 2 µm.

Also, the processor may determine the second temperature, such that the aerosol whose temperature changes in correspondence to the temperature of the absorbed aerosol generating material is higher than or equal to 45° C. at a discharge hole for discharging the aerosol to the outside, and the vibrator may transfer heat to the absorbed aerosol generating material, such that the temperature of the aerosol at the discharge hole is higher than or equal to 45° C.

Also, the vibrator may vibrate at a vibration amplitude corresponding to a magnitude of an applied voltage, and the processor may reduce a magnitude of a voltage applied to the vibrator and the amplitude of the vibrator as compared to those in a smoke mode in which visible smoke is produced from the aerosol generating device, such that the aerosol generating device operates in a smokeless mode in which no visible smoke is produced.

Also, the processor may determine the magnitude of the voltage applied to the vibrator, such that consumption of the aerosol generating material per unit time is less than or equal to a predetermined value in the smokeless mode, and the vibrator may atomize the aerosol generating material of an amount less than the predetermined value for a unit time by vibrating at an amplitude corresponding to the determined magnitude of the voltage.

According to another aspect of the present disclosure, an aerosol generating apparatus includes a liquid storage configured to accommodate an aerosol generating material; a vibrator configured to generate ultrasonic vibration to atomize the aerosol generating material into an aerosol; and a processor configured to apply a voltage of a first magnitude to the vibrator in a smoke mode in which visible smoke is produced from the aerosol generating device and apply a voltage of a second magnitude smaller than the first magnitude to the vibrator in a smokeless mode in which no visible smoke is produced, thereby controlling a temperature of the vibrator to a temperature corresponding to the second magnitude, which is lower than a temperature corresponding to the first magnitude.

Also, a viscosity of an aerosol generating material moved from the liquid storage and absorbed by a liquid delivery element may increase as the temperature of the vibrator decreases, and, as a voltage of the second magnitude is applied in the smokeless mode, the vibrator may atomize an aerosol generating material having an increased viscosity than in the smoke mode to which a voltage of the first magnitude is applied.

Also, the processor may determine the second magnitude, such that consumption of the aerosol generating material per unit time in the smokeless mode is equal to or less than a predetermined value.

According to another aspect of the present disclosure, an aerosol generating device includes a liquid storage configured to accommodate an aerosol generating material; a vibrator configured to generate ultrasonic vibration to atomize the aerosol generating material into an aerosol; and a processor configured to control a vibration frequency of the vibrator to a first vibration frequency in a smoke mode in which visible smoke is produced from the aerosol generating device and controls the vibration frequency of the vibrator to a second vibration frequency lower than the first vibration frequency by applying a voltage of a sub resonant frequency, which is lower than a main resonant frequency that causes a largest resonance from among a plurality of resonant frequencies of the vibrator.

Also, a particle size of an atomized aerosol increases as the vibration frequency may decrease, and the vibrator may vibrate at the second vibration frequency in the smokeless mode to generate an aerosol having a larger particle size than in the smokeless mode in which the vibrator vibrates at the first vibration frequency.

Also, the particle size of the aerosol may be larger than 2 µm and smaller than or equal to 10 µm in the smokeless mode and is larger than or equal to 0.2 µm and smaller than or equal to 2 µm in the smoke mode.

Also, the processor may apply a voltage of the main resonant frequency or a voltage of a frequency between the main resonant frequency and the sub-resonant frequency to the vibrator in the smoke mode.

MODE FOR INVENTION

With respect to the terms used to describe the various embodiments, general terms which are currently and widely used are selected in consideration of functions of structural elements in the various embodiments. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the embodiments will now be described more fully with reference to the accompanying drawings, in which exemplary embodiments are shown such that one of ordinary skill in the art may easily work the embodiments. The embodiments can, however, be embodied in many different forms and should not be construed as being limited to the embodiments set forth herein.

Hereinafter, embodiments will be described in detail with reference to the drawings.

FIG. 1 is a block diagram of an aerosol generating device according to an embodiment.

Referring to FIG. 1, an aerosol generating device 100 may include a battery 110, an atomizer 120, a sensor 130, a user interface 140, a memory 150, and a processor 160. However, the internal structure of the aerosol generating device 100 is not limited to those illustrated in FIG. 1. According to the design of the aerosol generating device 100, it will be understood by one of ordinary skill in the art that some of the hardware components shown in FIG. 1 may be omitted or new components may be added.

In an embodiment, the aerosol generating device 100 may include a main body, and, in this case, hardware components included in the aerosol generating device 100 are located in the main body.

In another embodiment, the aerosol generating device 100 may include a main body and a cartridge, and hardware components included in the aerosol generating device 100 may be located distributively in the main body and the cartridge. Alternatively, at least some of hardware components included in the aerosol generating device 100 may be located in the main body and the cartridge, respectively.

Hereinafter, an operation of each of the components will be described without being limited to location in a particular space in which the components of the aerosol generating device 100 are located.

The battery 110 supplies electric power used for the aerosol generating device 100 to operate. In other words, the battery 110 may supply power, such that the atomizer 120 may atomize an aerosol generating material. Also, the battery 110 may supply power for operation of other hardware components included in the aerosol generating device 100, such as the sensor 130, the user interface 140, the memory 150, and the processor 160. The battery 110 may be a rechargeable battery or a disposable battery.

For example, battery 110 may include a nickel-based battery (e.g., a nickel-metal hydride battery or a nickel-cadmium battery), or a lithium-based battery (e.g., a lithium-cobalt battery, a lithium-phosphate battery, a lithium titanate battery, a lithium-ion battery, or a lithium-polymer battery). However, types of the battery 110 that may be used in the aerosol generating device 100 are not limited thereto. If necessary, the battery 110 may include an alkaline battery or a manganese battery.

The atomizer 120 receives power from the battery 110 under the control of the processor 160. The atomizer 120 may receive power from the battery 110 and atomize an aerosol generating material stored in the aerosol generating device 100.

The atomizer 120 may be located in the main body of the aerosol generating device 100. Alternatively, when the aerosol generating device 100 includes a main body and a cartridge, the atomizer 120 may be located in the cartridge or may be divided into portions and located in the main body and the cartridge. When the atomizer 120 is located in the cartridge, the atomizer 120 may receive power from the battery 110 located in at least one of the main body and the cartridge. Also, when the atomizer 120 is divided into portions and located in the main body and the cartridge, a portion of the atomizer 120 that needs power supply may receive power from the battery 110 located in at least one of the main body and the cartridge.

The atomizer 120 generates an aerosol from an aerosol generating material in the cartridge. An aerosol refers to a suspension in which liquid and/or solid fine particles are dispersed in a gas. Therefore, an aerosol generated from the atomizer 120 may refer to a state in which vaporized particles generated from the aerosol generating material and the air are mixed. For example, the atomizer 120 may transform a phase of an aerosol generating material into a gas phase through vaporization and/or sublimation. Also, the atomizer 120 may generate an aerosol by discharging an aerosol generating material in the liquid state and/or the solid phase as fine particles.

For example, the atomizer 120 may generate an aerosol from an aerosol generating material by using an ultrasonic vibration method. The ultrasonic vibration method may refer to a method of generating an aerosol by atomizing an aerosol generating material with ultrasonic vibration generated by a vibrator.

Although not shown in FIG. 1, the atomizer 120 may optionally include a heater capable of heating the aerosol generating material by generating heat. The aerosol generating material may be heated by the heater, and thus an aerosol may be generated.

The heater may include any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. Also, the heater may be implemented by a metal wire, a metal plate on which an electrically conductive track is arranged, or a ceramic heating element, but is not limited thereto.

For example, in an embodiment the heater may be a portion of a cartridge. Also, the cartridge may include a liquid delivery element and the liquid storage described later. The aerosol generating material accommodated in the liquid storage may be moved to the liquid delivery element, and the heater may heat the aerosol generating material absorbed by the liquid delivery element, thereby generating aerosol. For example, the heater may be wound around the liquid delivery element or disposed adjacent to the liquid delivery element.

In another embodiment, the aerosol generating device 100 may include an accommodating space capable of accommodating a cigarette, and the heater may heat a cigarette inserted into the accommodating space of the aerosol generating device 100. As the cigarette is accommodated in the accommodating space of the aerosol generating device 100, the heater may be located inside and/or outside the cigarette. Accordingly, the heater may generate an aerosol by heating the aerosol generating material in the cigarette.

Meanwhile, the heater may include an induction heater. The induction heater may include an electrically conductive coil for inducing an alternating magnetic field. In this case, the cigarette or the cartridge may include a susceptor which may be heated by the alternating magnetic field.

The aerosol generating device 100 may include at least one sensor 130. A result sensed by the at least one sensor 130 is transmitted to the processor 160, and the processor 160 may control the aerosol generating device 100 to perform various functions such as controlling the operation of the atomizer 120, restricting smoking, determining whether a cartridge (or a cigarette) is inserted, and displaying a notification.

For example, the at least one sensor 130 may include a puff detecting sensor. The puff detecting sensor may detect a user's puff based on any one of a flow change of the air introduced from the outside, a pressure change, and detection of a sound. The puff detecting sensor may detect a start timing and an end timing of a puff of a user, and the processor 160 may determine a puff period and a non-puff period according to a detected start timing and a detected end timing of the puff.

Also, the at least one sensor 130 may include a user input sensor. The user input sensor may be a sensor capable of receiving a user input, e.g., a switch, a physical button, or a touch sensor. For example, a touch sensor may be a capacitive sensor capable of detecting an input of a user by detecting a change in capacitance that occurs when the user touches a predetermined area of a metal material. The processor 160 may determine whether a user input has occurred by comparing values before and after a change in capacitance received from a capacitive sensor. When a value before or after a change in capacitance exceeds a preset threshold value, the processor 160 may determine that a user input has occurred.

Also, the at least one sensor 130 may include a motion sensor. Information regarding the movement of the aerosol generating device 100, such as inclination, moving speed, and acceleration of the aerosol generating device 100, may be obtained through the motion sensor. For example, the motion sensor may measure information regarding a state in which the aerosol generating device 100 is moving, a state in which the aerosol generating device 100 is stationary, a state in which the aerosol generating device 100 is tilted at an angle within a predetermined range for a puff operation, and a state in which the aerosol generating device 100 is tilted at an angle different from the angle for a puff operation between puff operations. The motion sensor may measure motion information regarding the aerosol generating device 100 by using various methods known in the art. For example, the motion sensor may include an acceleration sensor capable of measuring acceleration in 3 directions, that is, an x-axis direction, a y-axis direction, and a z-axis direction, and a gyro sensor capable of measuring angular velocity in the three directions.

Also, the at least one sensor 130 may include a proximity sensor. The proximity sensor refers to a sensor that detects the presence of or a distance to an approaching object or an object existing in the vicinity without a mechanical contact by using an electromagnetic field or an infrared ray, and thus the proximity sensor enables detection of whether a user is approaching toward the aerosol generating device 100.

Also, the at least one sensor 130 may include an image sensor. The image sensor may include, for example, a camera for obtaining an image of an object. The image sensor may recognize an object based on an image obtained by the camera. The processor 160 may analyze an image obtained through the image sensor and determine whether a user is in a situation for using the aerosol generating device 100. For example, when a user approaches the aerosol generating device 100 to the vicinity of lips of the user to use the aerosol generating device 100, the image sensor may obtain an image of the lips. The processor 160 may analyze the obtained image and, when it is determined that an object in the image is the lips, may determine that the user is in a situation for using the aerosol generating device 100. Therefore, the aerosol generating device 100 may operate the atomizer 120 in advance or pre-heat the heater.

Also, the at least one sensor 130 may include a consumable detachment sensor capable of detecting attachment or detachment of a consumable (e.g., a cartridge, a cigarette, etc.) that may be used in the aerosol generating device 100. For example, the consumable detachment sensor may detect whether a consumable is in contact with the aerosol generating device 100 or determine whether the consumable is detached, through an image sensor. Also, the consumable detachment sensor may be an inductance sensor that detects a change in an inductance value of a coil capable of interacting with a marker of a consumable or a capacitance sensor that detects a change in a capacitance value of a capacitor capable of interacting with a marker of a consumable.

Also, the at least one sensor 130 may include a temperature sensor. The temperature sensor may detect a temperature at which the heater of the atomizer 120 (or an aerosol generating material) is heated. The aerosol generating device 100 may include a separate temperature sensor for sensing the temperature of the heater or the heater itself may serve as a temperature sensor instead of a separate temperature sensor. Alternatively, a separate temperature sensor may be further included in the aerosol generating device 100 while the heater functions as a temperature sensor. Also, the temperature sensor may sense the temperature of internal components like a printed circuit board (PCB) and a battery of the aerosol generating device 100 as well as the temperature of the heater.

Also, the at least one sensor 130 may include various sensors for measuring information regarding the surrounding environment of the aerosol generating device 100. For example, the at least one sensor 130 may include a temperature sensor capable of measuring the temperature of the surrounding environment, a humidity sensor capable of measuring the humidity of the surrounding environment, an atmospheric pressure sensor capable of measuring the pressure of the surrounding environment, etc.

The sensor 130 that may be provided in the aerosol generating device 100 is not limited to the above-described types and may further include various other sensors. For example, the aerosol generating device 100 may include a fingerprint sensor capable of obtaining fingerprint information from a user's finger for user authentication and security, an iris recognition sensor that analyzes an iris pattern of a pupil, and a vein recognition sensor that detects an amount of infrared absorption of reduced hemoglobin in a vein, a facial recognition sensor that 2-dimensionally or 3-dimensionally recognizes feature points like eyes, a nose, a mouth, and a facial contour, a radio-frequency Identification (RFID) sensor, etc.

In the aerosol generating device 10, only some of various examples of the sensor 130 given above may be selectively implemented. In other words, the aerosol generating device 100 may combine and utilize information sensed by at least one of the above-stated sensors.

The user interface 140 may provide the user with information about the state of the aerosol generating device 100. The user interface 140 may include various interfacing devices, such as a display or a lamp for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices.

However, the aerosol generating device 100 may be implemented by selecting only some of various examples of the user interface 140 given above.

The memory 150 may be a hardware component configured to store various pieces of data processed in the aerosol generating device 100, and the memory 150 may store data processed or to be processed by the processor 160. The memory 150 may include various types of memories, such as random access memory, such as dynamic random access memory (DRAM), static random access memory (SRAM), etc., read-only memory (ROM), electrically erasable programmable read-only memory (EEPROM), etc.

The memory 150 may store an operation time of the aerosol generating device 100, the maximum number of puffs, the current number of puffs, at least one temperature profile, data on a user's smoking pattern, etc.

The processor 160 controls the overall operation of the aerosol generating device 100. The processor 160 may be implemented as an array of a plurality of logic gates or can be implemented as a combination of a general-purpose microprocessor and a memory in which a program executable in the microprocessor is stored. Also, it may be understood by one of ordinary skill in the art that the processor 160 may be implemented as other types of hardware.

The processor 160 analyzes a result of the sensing by the at least one sensor 130, and controls processes that are to be performed subsequently.

The processor 160 may control power supplied to the atomizer 120 so that the operation of the atomizer 120 is started or terminated, based on a result of sensing by the at least one sensor 130. Also, based on a result of sensing by the at least one sensor 130, the processor 160 may control an amount of power supplied to the atomizer 120 and a time period of supplying the power, such that the atomizer 120 generates an appropriate amount of aerosol. For example, the processor 160 may control a current or a voltage supplied to a vibrator of the atomizer 120, such that the vibrator of the atomizer 120 vibrates at a predetermined vibration frequency.

In an embodiment, the processor 160 may start the operation of the atomizer 120 after a user input for the aerosol generating device 100 is received. Also, the processor 160 may start the operation of the atomizer 120 after detecting a puff of a user by using the puff detecting sensor. Also, the processor 160 may stop supplying power to the atomizer 120 when the number of puffs counted by the puff detecting sensor reaches a pre-set number.

The processor 160 may control the user interface 140 based on the result of the sensing by the at least one sensor 130. For example, when the number of puffs reaches the pre-set number after the number of puffs is counted by using the puff detecting sensor, the processor 160 may notify the user by using at least one of a lamp, a motor, or a speaker that the operation of the aerosol generating device 100 will soon be terminated.

Furthermore, although not illustrated in FIG. 1, the aerosol generating device 100 may form an aerosol generating system together with a separate cradle. For example, the cradle may be used to charge the battery 110 of the aerosol generating device 100. For example, the aerosol generating device 100 may be supplied with power from a battery of the cradle to charge the battery 110 of the aerosol generating device 100 while being accommodated in an accommodating space of the cradle.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Figure 2:
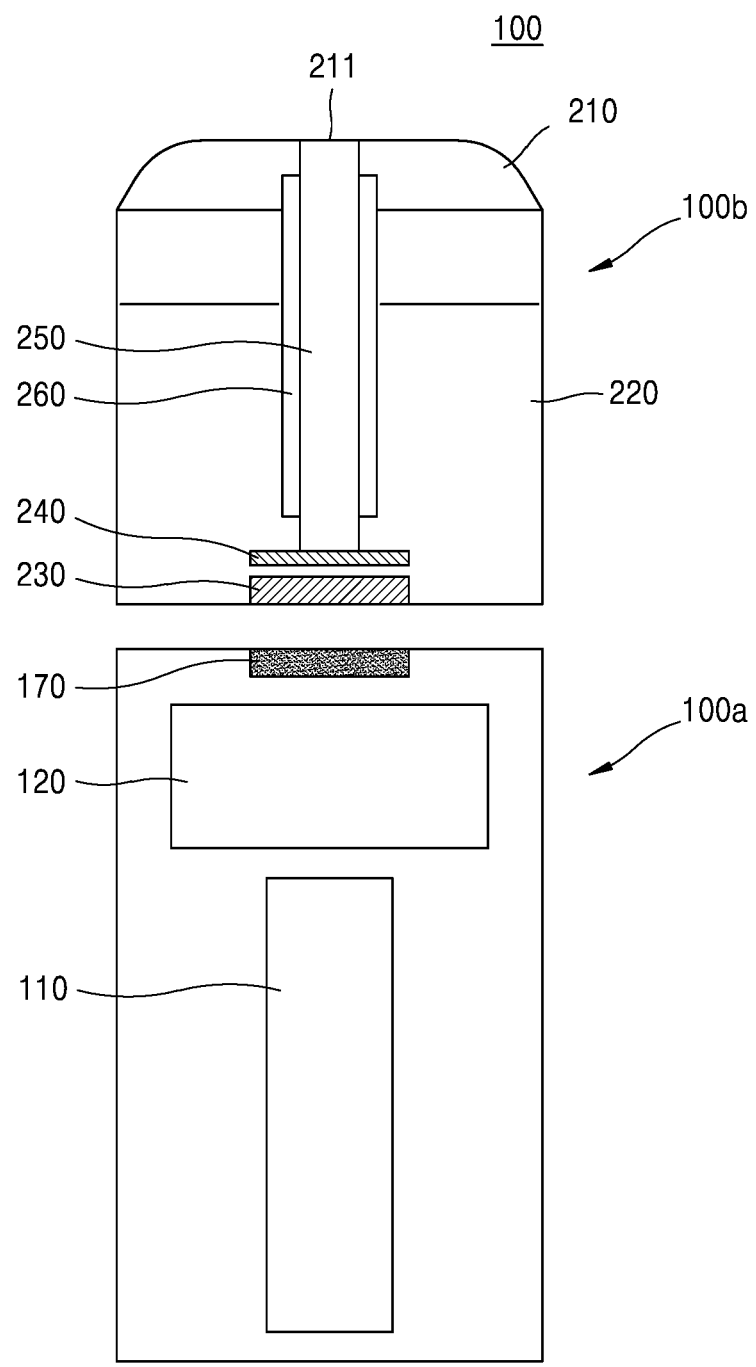
FIG. 2 is a diagram schematically showing an aerosol generating device according to the embodiment shown in FIG. 1.

FIG. 2 is a diagram schematically showing an aerosol generating device according to the embodiment shown in FIG. 1.

The aerosol generating device 100 according to the embodiment shown in FIG. 1 includes a cartridge 100b containing an aerosol generating material and a main body 100a supporting the cartridge 100b.

The cartridge 100b may be coupled to the main body 100a in a state in which the aerosol generating material is accommodated therein. For example, a portion of the cartridge 100b may be inserted into the main body 100a or a portion of the main body 100a may be inserted into the cartridge 100b, such that the cartridge 100b the main body 100a are combined. For example, the main body 100a and the cartridge 100b may maintain a coupled state by a snap-fit method, a screw coupling method, a magnetic coupling method, a forced coupling method, etc. However, the methods of coupling the main body 100a and the cartridge 100b to each other are not limited thereto.

The cartridge 100b may include a mouthpiece 210. The mouthpiece 210 may be formed at an end portion of the cartridge 100b opposite to the other end portion of the cartridge 100b coupled to the main body 100a. The mouthpiece 210 may be inserted into the user's oral cavity. The mouthpiece 210 may include a discharge hole 211 for discharging the aerosol generated from the aerosol generating material inside the cartridge 100b to the outside.

The cartridge 100b may contain an aerosol generating material in any one of, for example, a liquid state, a solid state, a gaseous state, or a gel state. The aerosol generating material may include a liquid composition. For example, the liquid composition may be a liquid including a tobacco-containing material containing volatile tobacco flavor components or may be a liquid including a non-tobacco material.

For example, the liquid composition may include one component of water, solvents, ethanol, plant extracts, spices, flavorings, and vitamin mixtures, or a mixture of these components. The spice may include, but is not limited to, menthol, peppermint, spearmint oil, and various fruit flavoring ingredients. The flavoring may include ingredients capable of providing a user with a variety of flavors. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 100, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 100b may include a liquid storage 220 containing (i.e., accommodating) an aerosol generating material therein. In other words, the liquid storage 220 may serve as a container for holding an aerosol generating material. To this end, the liquid storage 220 may include therein an element containing an aerosol generating material, such as a sponge, cotton, fabric, or porous ceramic structure.

The aerosol generating device 100 may include an atomizer that converts changes phase of the aerosol generating material inside the cartridge 100b to generate an aerosol.

For example, the atomizer of the aerosol generating device 100 may change the phase of the aerosol generating material by using an ultrasonic vibration method of atomizing the aerosol generating material with ultrasonic vibration. The atomizer may include a vibrator 170 that generates ultrasonic vibrations, a liquid delivery element 240 that absorbs an aerosol generating material and maintains the same in an optimal state for conversion into an aerosol, and a vibration receiving unit 230 for generating an aerosol by transmitting ultrasonic vibrations to the aerosol generating material of a liquid delivery element.

The vibrator 170 may generate vibration of a short period. The vibration generated by the vibrator 170 may be ultrasonic vibration, and the frequency of the ultrasonic vibration may be, for example, from about 100 kHz to about 3.5 MHz. By the short-period vibration generated by the vibrator 170, the aerosol generating material may be vaporized and/or atomized into an aerosol.

The vibrator 170 may include, for example, a piezoelectric ceramic capable of interconverting an electrical force and a mechanical force by generating electricity (e.g., voltage) in response to a physical force (e.g., pressure) or generating vibration (e.g., mechanical force) in response to electricity. Therefore, vibration is generated by electricity applied to the vibrator 170, and the small physical vibration may split the aerosol generating material into small particles, thereby atomizing the aerosol generating material into an aerosol.

The vibrator 170 may be electrically connected to a circuit through a pogo pin or a C-clip. Therefore, the vibrator 170 may generate vibration by receiving a current or a voltage through the pogo pin or the C-clip. However, the types of elements connected to supply a current or a voltage to the vibrator 170 are not limited thereto.

The vibration receiving unit 230 may perform the function of receiving vibration generated by the vibrator 170 and converting the aerosol generating material received from the liquid storage 220 into an aerosol.

The liquid delivery element 240 may deliver a liquid composition of the liquid storage 220 to the vibration receiving unit 230. For example, the liquid delivery element 240 may be a wick including cotton fiber, ceramic fiber, glass fiber, or porous ceramic, but is not limited thereto.

The atomizer may also be implemented with a vibration receiving unit alone, without a separate liquid delivery element. In this case, the vibration receiving unit may have a mesh shape or a plate shape so that an aerosol generating material is absorbed and maintained at the optimal state for conversion into an aerosol. The vibration receiving unit may generate an aerosol by transmitting vibration to the aerosol generating material.

Although FIG. 2 shows that the vibrator 170 of the atomizer is disposed in the main body 100a, and the vibration receiving unit 230 and the liquid delivery element 240 are arranged in the cartridge 100b, the present disclosure is not limited thereto. For example, the cartridge 100b may include the vibrator 170, the vibration receiving unit 230, and the liquid delivery element 240. In this case, when a portion of the cartridge 100b is inserted into the main body 100a, the main body 100a may provide power to the cartridge 100b or supply a signal related to the operation of the cartridge 100b to the cartridge 100b through a terminal (not shown), thereby controlling the operation of the vibrator 170.

At least a portion of the liquid storage 220 of the cartridge 100b may include a transparent material so that the aerosol generating material accommodated in the cartridge 100b may be visually identified from the outside. The mouthpiece 210 and the liquid storage 220 may be entirely formed of transparent plastic or glass, and only a portion of the liquid storage 220 may be formed of a transparent material.

The cartridge 100b of the aerosol generating device 100 may include an aerosol discharging path 250 and an airflow path 260.

The aerosol discharging path 250 may be formed in the liquid storage 220 and may be in fluid communication with the discharge hole 211 of the mouthpiece 210. Therefore, an aerosol generated by the atomizer may move along the aerosol discharging path 250 and may be delivered to a user through the discharge hole 211 of the mouthpiece 210.

The airflow path 260 is a path through which the outside air may be introduced into the aerosol generating device 100. The outside air introduced through the airflow path 260 may flow into the aerosol discharging path 250 or a space in which an aerosol is generated. Therefore, the outside air may be mixed with vaporized particles generated from an aerosol generating material to generate an aerosol.

For example, as shown in FIG. 2, the airflow path 260 may be formed to surround the outside of the aerosol discharging path 250. Therefore, the aerosol discharging path 250 and the airflow path 260 may constitute a double tube shape in which the aerosol discharging path 250 is disposed inside and the airflow path 260 is disposed outside the aerosol discharging path 250. Therefore, the outside air may be introduced through the airflow path 260 in a direction opposite to a direction in which an aerosol moves in the aerosol discharging path 250.

Meanwhile, the airflow path 260 is not limited to the structure described above. For example, the airflow path 260 may be a space formed between the main body 100a and the cartridge 100b when the main body 100a and the cartridge 100b are coupled to each other. The airflow path 260 may be in fluid communication with the atomizer.

In the aerosol generating device 100 according to the above-described embodiment, the cross section of the aerosol generating device 100 taken perpendicular to the lengthwise direction of the main body 100a and the cartridge 100b may be approximately circular, oval, square, rectangular, or in various polygonal shapes. However, the cross-sectional shape of the aerosol generating device 100 is not limited to the above-stated shapes, and the aerosol generating device 100 is not necessarily limited to a structure linearly extending in the lengthwise direction. For example, for comfortable grip, the cross-sectional shape of the aerosol generating device 100 may be in a streamlined shape or may be bent at a predetermined angle in a specific region. The cross-sectional shape of the aerosol generating device 100 may change along the lengthwise direction.

Figure 3:
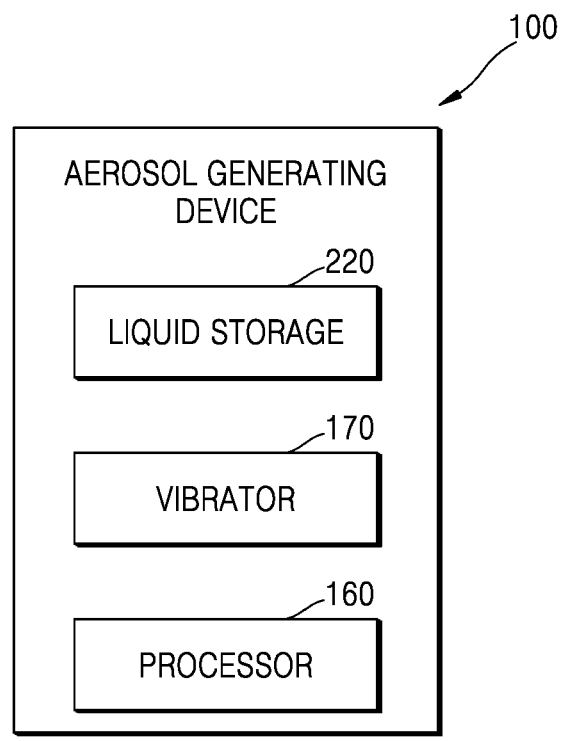
FIG. 3 is a block diagram showing the configuration of an aerosol generating device according to an embodiment.

FIG. 3 is a block diagram showing the configuration of an aerosol generating device according to an embodiment.

Referring to FIG. 3, the aerosol generating device 100 may include the liquid storage 220, the vibrator 170, and the processor 160. The liquid storage 220, the vibrator 170, and the processor 160 of FIG. 3 may correspond to the liquid storage 220, the vibrator 170, and the processor 160 of FIGS. 1 and 2.

FIG. 3 illustrates certain components of the aerosol generating device 100, which are particularly related to the present embodiment. Accordingly, it will be understood by one of ordinary skill in the art pertaining to the present embodiment that other general-purpose elements may be further included in the aerosol generating device 100 in addition to the elements illustrated in FIG. 3.

The liquid storage 220 may accommodate an aerosol generating material. The liquid storage 220 may directly contain an aerosol generating material or may include a sponge or the like that contains an aerosol generating material. The aerosol generating material may be in a liquid state, a solid state, a gaseous state, or a gel state. The aerosol generating material may include a liquid composition.

The aerosol generating device 100 may include a liquid delivery element (not shown). The liquid delivery element may receive and absorb the aerosol generating material from the liquid storage unit 220. The liquid delivery element may maintain the aerosol generating material in an optimal state for conversion into an aerosol. The liquid delivery element may be disposed adjacent to the vibrator 170 (or a vibration receiver), and the aerosol generating material absorbed by the liquid delivery element may receive ultrasonic vibrations from the vibrator 170 (or the vibration receiver) and may be converted into an aerosol.

The vibrator 170 may generate ultrasonic vibration to atomize the aerosol generating material into an aerosol. The vibration frequency of the ultrasonic vibration may be, for example, from about 100 kHz to about 3.5 MHz. However, the vibration frequency of the ultrasonic vibration stated above is merely an example, and may differ according to embodiments.

The temperature of the vibrator 170 may rise as it vibrates. The vibrator 170 may convert electrical energy into kinetic energy (or vibration energy) and thermal energy. For example, the vibrator 170 may vibrate at a predetermined vibration speed and at a predetermined amplitude by converting a part of electrical energy into kinetic energy. The vibrator 170 may increase the temperature thereof by converting the remaining part of the electrical energy into thermal energy. Electrical energy that is not converted into kinetic energy by the vibrator 170 may be converted into thermal energy. The thermal energy may include frictional heat or Joule heating.

The vibrator 170 may transfer heat to the aerosol generating material, such that the temperature of the aerosol-generating material rises. The vibrator 170 may vibrate and generate heat as a voltage of a particular frequency is applied thereto and may increase the temperature of the aerosol generating material by transferring vibration energy and thermal energy to the aerosol generating material absorbed by the liquid delivery element. Therefore, the temperature of the aerosol generating material absorbed by the liquid delivery element may be changed in accordance with the temperature of the vibrator 170. For example, the temperature of the aerosol generating material may increase as the temperature of the vibrator 170 increases. Also, the temperature of the aerosol generating material may decrease as the temperature of the vibrator 170 decreases.

By vibration of the vibrator 170, the temperature of the aerosol generating material may be increased to a predetermined temperature that atomizes the aerosol generating material into an aerosol. For example, when the aerosol generating material is in the form of a viscous liquid, the viscosity of the aerosol generating material needs to be reduced by increasing the temperature of the aerosol generating material. As the viscosity of the aerosol generating material is reduced, the time for atomization by vibration may be shortened, thereby further increasing an amount of atomization.

The vibrator 170 may have a unique resonant frequency. The resonant frequency of the vibrator 170 may be set during a design and manufacturing process. In other words, the resonant frequency of each vibrator 170 may differ depending on designs. The resonance frequency and the resonance phenomenon will be described later with reference to FIG. 4.

The processor 160 may be electrically connected to each component of the aerosol generating device 100 and electrically control the component. The processor 160 may vibrate the vibrator 170 by applying a voltage (or power) to the vibrator 170. For example, the processor 160 may control a battery, such that a voltage (or power) is applied to the vibrator 170. Also, the processor 160 may determine a frequency of a voltage applied to the vibrator 170 and apply a voltage of a determined frequency to the vibrator 170.

In an embodiment, the processor 160 may apply a voltage of an operating frequency for controlling the temperature of the vibrator 170 to a particular temperature to the vibrator 170. The processor 160 may apply a voltage of the operating frequency to the vibrator 170, such that the impedance of the vibrator 170 may become higher than that in the case of applying a voltage of a resonant frequency to the vibrator 170. Detailed descriptions thereof will be given later with reference to FIG. 4.

In another embodiment, the processor 160 may adjust the magnitude of a voltage applied to the vibrator 170. For example, the processor 160 may adjust the peak or the amplitude of an AC voltage applied to the vibrator 170. The vibrator 170 may vibrate at an amplitude corresponding to the magnitude of an applied voltage. As the magnitude of the voltage applied to the vibrator 170 increases, the amplitude at which the vibrator 170 vibrates may increase. On the contrary, as the magnitude of the voltage applied to the vibrator 170 decreases, the amplitude at which the vibrator 170 vibrates may decrease.

Meanwhile, the aerosol generating device 100 may operate in a smokeless mode in which visible smoke is not generated or in a smoke mode in which visible smoke (i.e., vapor) is generated. The aerosol generating device 100 may generate an aerosol that does not contain visible smoke in the smokeless mode. On the other hand, the aerosol generating device 100 may generate an aerosol that contains visible smoke in the smoke mode. Depending on an amount of atomization or a degree of saturation of substances included in the aerosol, visible smoke may or may not be produced even when the aerosol is generated. Even when no visible smoke is produced (i.e., even in the smokeless mode), ingredients such as nicotine and flavors may be transferred. The smokeless mode is a mode in which the amount of atomization is smaller than that in the smoke mode and may include cases where a smaller amount of visible smoke is produced than in the smoke mode in addition to a case where no visible smoke is produced. For example, the smoke mode is a basic mode or a default mode for the aerosol generating device 100, and, in the smoke mode, a voltage of a magnitude pre-set to produce a sufficient amount of visible smoke may be applied to the vibrator 170.

The processor 160 may adjust the magnitude of a voltage applied to the vibrator 170 and the vibration amplitude of the vibrator 170, such that the aerosol generating device 100 operates according to one of the smokeless mode and the smoke mode. The processor 160 may adjust the magnitude of the voltage applied to the vibrator 170 and the vibration amplitude of the vibrator 170, such that the atomization amount of the aerosol is relatively small in the smokeless mode and is relatively large in the smoke mode.

When the vibration amplitude of the vibrator 170 is increased as the magnitude of the voltage applied by the processor 160 to the vibrator 170 is increased, the amount of an aerosol atomized from the aerosol generating material increases. On the contrary, when the amplitude of the vibrator 170 is decreased as the magnitude of the voltage applied by the processor 160 to the vibrator 170 is reduced, the amount of an aerosol atomized from the aerosol generating material decreases. Therefore, the processor 160 may reduce the magnitude of the voltage applied to the vibrator and the vibration amplitude of the vibrator 170 to switch from the smoke mode to the smokeless mode. In this case, the amount of atomization decreases as the aerosol generating device 100 operates in the smokeless mode. In the smokeless mode, a user may use the aerosol generating device 100 with no restrictions on place.

In another embodiment, the processor 160 may control the temperature of the vibrator 170 by adjusting the magnitude of the voltage applied to the vibrator 170. The temperature of the vibrator 170 is controlled according to the magnitude of the voltage and vibrates at the controlled temperature, thereby atomizing the aerosol generating material. As the magnitude of the voltage applied to the vibrator 170 increases, a large amount of power is supplied to the vibrator 170, and thus a large amount of heat may be generated by the vibrator 170. The temperature of the aerosol generating material absorbed by the liquid delivery element changes in proportion to the temperature of the vibrator 170, and the viscosity of the aerosol generating material changes in inverse proportion to the temperature of the aerosol generating material decreases. Thus, the viscosity of the aerosol generating material absorbed by the liquid delivery element may increase as the temperature of the vibrator 170 decreases. Therefore, the processor 160 may control the temperature of the aerosol generating material by controlling the temperature of the vibrator 170 and may adjust the viscosity of the aerosol generating material by controlling the temperature of the aerosol generating material.

As the voltage applied by the processor 160 to the vibrator 170 is increased, the temperature of the vibrator 170 is increased, and thus the viscosity of the aerosol generating material may decrease. As the viscosity of the aerosol generating material decreases, the aerosol generating material is more easily split into particles, and thus a larger amount of aerosol may be generated per unit time as compared to a case where the viscosity of the aerosol generating material is higher. Therefore, the processor 160 may increase the atomization amount of an aerosol by reducing the viscosity of the aerosol generating material. On the contrary, when the temperature of the vibrator 170 is decreased as the magnitude of the voltage applied by the processor 160 to the vibrator 170 is reduced, the viscosity of the aerosol generating material may increase. As a result, the atomization amount of an aerosol may be reduced.

The processor 160 may apply a voltage of a first magnitude to the vibrator 170 in the smoke mode. In this case, the temperature of the vibrator 170 may change in accordance with the magnitude of a voltage applied thereto (i.e., the first magnitude). The first magnitude may be a predetermined value that causes the aerosol generating device to generate a sufficient amount of aerosol. For example, the processor 160 may determine the first magnitude such that the consumption of an aerosol generating material per unit time exceeds a predetermined value. The consumption of the aerosol generating material may correspond to the mass or the volume of an aerosol generating material that decreases by atomization. The predetermined value is the mass of an aerosol generating material that decreases per unit time during a puff. For example, the predetermined value may be 1 μg per second or 2 μg per 2 seconds. However, the predetermined value may be changed based on an output power of a battery, the performance of the vibrator 170, the characteristics of an aerosol generating material, etc.

The processor 160 may apply a voltage of a second magnitude smaller than the first magnitude to the vibrator 170 in the smokeless mode. The processor 160 may apply a voltage of the second magnitude to the vibrator 170, thereby controlling the temperature of the vibrator 170 to a temperature corresponding to the voltage of the second magnitude, which is lower than the temperature corresponding to the voltage of the first magnitude. Accordingly, the temperature of the vibrator 170 is controlled to be lower than that in the smoke mode, and thus the vibrator 170 may atomize an aerosol generating material with a higher viscosity than in the smoke mode. As a result, the amount of atomization may be reduced as compared to the smoke mode. The second magnitude may be a value that causes that aerosol generating device to generate an aerosol without producing visible smoke. For example, the processor 160 may determine the first magnitude such that the consumption of an aerosol generating material per unit time is smaller than or equal to a predetermined value. The predetermined value may correspond to, for example, 1 μg per second or 2 μg per 2 seconds. However, the predetermined value may be changed based on an output power of a battery, the performance of the vibrator 170, the characteristics of an aerosol generating material, etc.

Also, the processor 160 may adjust the particle size of an atomized aerosol by adjusting the viscosity of an aerosol generating material. An aerosol atomized from an aerosol generating material with relatively high viscosity may include relatively large particles (e.g., larger than 2 μm and smaller than or equal to 10 μm), and an aerosol atomized from an aerosol generating material with relatively low viscosity may include relatively small particles (e.g., equal to or larger than 0.2 μm and smaller than or equal to 2 μm). In this regard, the processor 160 may adjust an atomization amount by controlling the particle size of an atomized aerosol by adjusting the viscosity of the aerosol generating material. Detailed descriptions thereof will be given later with reference to FIGS. 6 and 7.

Figure 4:
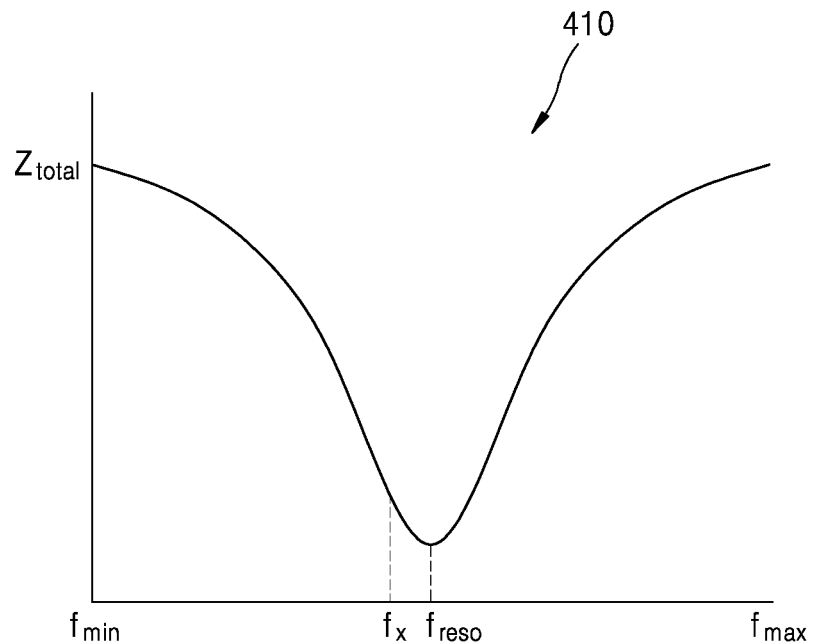
FIG. 4 is a graph showing an example of a relationship between the frequency of a voltage applied to a vibrator and the impedance of the vibrator.

FIG. 4 is a graph showing an example of a relationship between the frequency of a voltage applied to a vibrator and the impedance of the vibrator.

Referring to FIG. 4, the horizontal axis of a graph 410 indicates the frequency of a voltage applied to a vibrator, and the vertical axis indicates the impedance $Z_{total}$ of the vibrator. The frequency corresponding to the lowest impedance indicates the resonant frequency $f_{reso}$ of the vibrator.

The resonant frequency is a frequency at which resonance occurs. The resonance refers to a phenomenon in which, as a vibration system receives an external force having the same vibration frequency as its natural vibration frequency, the amplitude remarkably increases or the impedance remarkably decreases. The resonance is a phenomenon that occurs in all vibrations such as mechanical vibration and electrical vibration. In general, when an external force capable of vibrating a vibration system is applied, if the natural vibration frequency of the vibration system and the vibration frequency of the external force are the same, the vibration amplitude significantly increases.

On the same principle, when a plurality of vibrating bodies spaced apart by a predetermined distance vibrate at the same frequency, the plurality of vibrating bodies resonate with one another, which causes a decrease in impedance of the plurality of vibrating bodies.

Referring to the graph 410 of FIG. 4, a correlation between frequencies of a predetermined range including the resonant frequency $f_{reso}$ of the vibrator and impedance of the vibrator is shown. The impedance of the vibrator may be changed according to the frequency of the applied voltage. When a voltage having the resonant frequency $f_{reso}$ is applied to the vibrator, the impedance of the vibrator may be minimized. As a difference between the frequency of the voltage applied to the vibrator and the resonant frequency $f_{reso}$ increases, the impedance of the vibrator may increase. Therefore, the temperature of the vibrator may be controlled based on the impedance, and thus the vibrator may vibrate at the controlled temperature. When the voltage of the resonant frequency $f_{reso}$ is applied, the kinetic energy of the vibrator may be maximized, the thermal energy of the vibrator may be minimized, and the temperature of the vibrator may rise less as compared to cases where voltages of other frequencies are applied. As described above, it is common to apply a voltage of a resonant frequency to a vibrator to minimize the impedance of the vibrator, but the aerosol generating device may obtain unique effects by applying a voltage of a frequency other than the resonant frequency to the vibrator.

In an embodiment, the vibrator may be controlled to have a first temperature by applying a voltage of the resonant frequency $f_{reso}$. For example, the first temperature may correspond to a temperature when a voltage is applied to the vibrator in a default state of the aerosol generating device. The processor may determine an operating frequency $f_x$, which is a frequency of a voltage applied to the vibrator to control the vibrator to reach a second temperature (i.e., target temperature) which is higher than the first temperature. The second temperature may be set in consideration of the atomization amount or the temperature of an aerosol. The operating frequency $f_x$ is a frequency of a voltage applied to the vibrator to generate an aerosol by generating ultrasonic vibrations in the vibrator.

When the vibrator receives the voltage of the operating frequency $f_x$, the impedance of the vibrator may be increased as compared to the case where the voltage of the resonance frequency $f_{reso}$ is applied to the vibrator. Accordingly, a large amount of heat is generated, and thus the temperature of the vibrator may be increased as compared to the case where a voltage of the resonant frequency $f_{reso}$ is applied to the vibrator. Therefore, the processor may control the vibrator to the second temperature higher than the first temperature by applying a voltage of the operating frequency $f_x$ to the vibrator.

Since the aerosol generating material is vibrated by the vibrator, heat energy may be transferred from the vibrator to the aerosol generating material. The vibrator may transfer heat generated at the second temperature to the aerosol generating material that moved from the liquid reservoir and absorbed by the liquid delivery element. Since the temperature of the aerosol generating material changes in accordance with the temperature of the vibrator, the absorbed aerosol generating material may receive heat from the vibrator at the second temperature and reach a temperature corresponding to the second temperature.

The viscosity of the aerosol generating material absorbed by the liquid delivery element may decrease as the temperature of the aerosol generating material increases. Therefore, the vibrator may atomize the aerosol generating material having a reduced viscosity when the vibrator is at the second temperature, as compared to when the vibrator is at the first temperature. As the viscosity of the aerosol generating material decreases, the aerosol generating material is more easily split into particles, and thus a larger amount of aerosol may be generated per unit time as compared to a case where the viscosity of the aerosol generating material is high. Meanwhile, the size of aerosol particles atomized from the aerosol generating material with a reduced viscosity may have a diameter or longest measured length of about 0.2 μm to about 2 μm. Since the vibrator at the second temperature atomizes the aerosol generating material whose viscosity is reduced as compared to the case where the vibrator has the first temperature, a larger amount of aerosol may be generated per unit time. For example, the second temperature may be set such that the consumption of the aerosol generating material per unit time is 1.4 μg or more per second. However, the consumption of the aerosol generating material is merely an example and may be changed based on an output power of a battery, the performance of the vibrator, and the characteristics of the aerosol generating material.

Meanwhile, as the vibrator is controlled to have the second temperature, the impedance of the vibrator may increase as compared to the case where the vibrator is controlled to have the first temperature. As the impedance increases, the vibration energy of the vibrator decreases and the thermal energy increases. Therefore, although the temperature of the vibrator increases, the vibration frequency may decrease due to the decrease of the vibration energy. An amount of aerosol generated per unit time may be affected by both the increase of the thermal energy of the vibrator and the decrease of the vibration energy. Therefore, the processor may determine the second temperature such that the total atomization amount increases as compared to the case where the vibrator is controlled to have the first temperature, despite the decrease of the vibration energy. Assume that an increase in the amount of aerosol generated per unit time due to the increased temperature of the vibrator is a first value, and that a decrease in the amount of aerosol generated per unit time due to the decreased vibration energy of the vibrator is a second value. In this case, the processor may determine the second temperature such that the first value exceeds the second value. For example, the processor may determine the second temperature such that the vibrator consumes (i.e., atomizes) a larger amount of aerosol generating material at the second temperature than at the first temperature.

In another embodiment, the processor may apply a voltage of the operating frequency $f_x$ different from the resonant frequency $f_{reso}$ by a predetermined value, to the vibrator. The predetermined value may be, for example, from 1% to 5%. When the resonance frequency $f_{reso}$ is 3 MHZ, the processor may apply a voltage of 2.96 MHz, which is a frequency $f_x$ different from 3 MHz by 1.33%, to the vibrator. The predetermined value may be variously set according to a design based on the value of the resonance frequency, the performance of the battery, the performance of the vibrator, or the characteristics of the aerosol generating material. The above-described resonant frequency $f_{reso}$ (3 MHz), the predetermined value (1% to 5% 5%), and the frequency $f_x$ (2.96 MHz) are merely examples for explanation and may be variously modified. At the operating frequency $f_x$, the temperature of the vibrator is higher than that at the resonant frequency $f_{reso}$. In this case, however, the vibration energy is lower than that at the resonant frequency $f_{reso}$, and thus the vibration frequency may be lower than that at the resonant frequency $f_{reso}$. Therefore, the predetermined value for determining the operating frequency $f_x$ may be determined such that an aerosol may be most effectively generated in consideration of the increase of the temperature and the decrease of the vibration frequency of the vibrator. In this regard, the predetermined value may be experimentally, empirically, or mathematically determined within a range from 1% to 5%.

The temperature of an aerosol atomized from the aerosol generating material absorbed by the liquid delivery element may be changed in accordance with the temperature of the absorbed aerosol generating material. Therefore, a sense of warmth may be imparted to the aerosol atomized from the aerosol generating material whose temperature is increased as the vibrator is controlled to have the second temperature. The aerosol to which a sense of warmth is imparted may be discharged to the outside through a discharge hole (211 of FIG. 2). The discharge hole may form a hole through which an aerosol passes, such that the aerosol may be discharged to the outside of the aerosol generating device. The aerosol generating device may include a temperature sensor, and the temperature sensor may detect a temperature of the aerosol discharged to the outside of the aerosol generating device. For example, the temperature sensor may sense the temperature of the aerosol at the discharge hole.

The processor may determine the second temperature such that the temperature of the aerosol at the discharge hole reaches a target temperature. The target temperature of the aerosol may be determined to maximize satisfaction of a user when an aerosol is delivered to the user. The target temperature may be variously set according to a composition of the aerosol generating material, a temperature at which the aerosol is generated, or a user setting. For example, the processor may determine the second temperature such that the temperature of the aerosol at the discharge hole reaches 45° C. or higher. The processor may determine the second temperature such that the aerosol gives a sense of warmth and does not exceed a predetermined temperature that may decrease satisfaction of a user. For example, the processor may determine the second temperature such that the temperature of the aerosol at the discharge hole is 45° C. to 65° C. The vibrator may transfer heat at the second temperature to the aerosol generating material absorbed by the liquid delivery element, such that the temperature of an aerosol at the discharge hole becomes a target temperature (e.g., 45° C. or higher). As such, the aerosol generating device may impart a sense of warmth to an aerosol delivered to a user and thus provide the user with a satisfactory smoking experience.

In another embodiment, while a voltage of the operating frequency $f_x$ is being applied to the vibrator, the processor may adjust the magnitude of the voltage. By controlling the magnitude of the voltage, the processor may provide a sense of warmth to an aerosol and, at the same time, operate the aerosol generating device in the smokeless mode. When the temperature of the vibrator is controlled to the second temperature, the atomization amount is increased. Meanwhile, when the magnitude of the voltage is decreased, the atomization amount is decreased. In other words, both the temperature of the vibrator and the magnitude of the voltage may affect the atomization amount. Therefore, in order to reduce the total atomization amount while the vibrator is controlled to have the second temperature by the operating frequency $f_x$, it is necessary to set the magnitude of the voltage to be sufficient low such that the decrease in the atomization amount due to the reduced voltage is greater than the increase in the atomization amount due to the raised temperature of the vibrator.

The processor may determine the magnitude of the voltage applied to the vibrator such that the consumption of an aerosol generating material per unit time is less than or equal to a predetermined value in the smokeless mode. Here, the predetermined value may be, for example, 1 μg per second. However, the predetermined value may be changed based on an output power of a battery, the performance of the vibrator, the characteristics of an aerosol generating material, etc. In the smokeless mode, the vibrator may vibrate at an amplitude corresponding to a determined magnitude of a voltage, thereby atomizing the aerosol generating material less than or equal to the predetermined value per unit time.

In this case, the processor decreases the voltage to decrease the vibration amplitude of the vibrator and increases the temperature of the vibrator by applying a voltage of the operating frequency $f_x$, thereby decreasing the atomization amount of an aerosol while increasing the temperature of the aerosol. Therefore, since the aerosol generating device may provide a sense of warmth to the aerosol while operating in the smokeless mode, it is possible to provide a user with the convenience of using the aerosol generating device with no restrictions on place and, at the same time, provide a satisfaction according to the sense of warmth.

Figure 5:
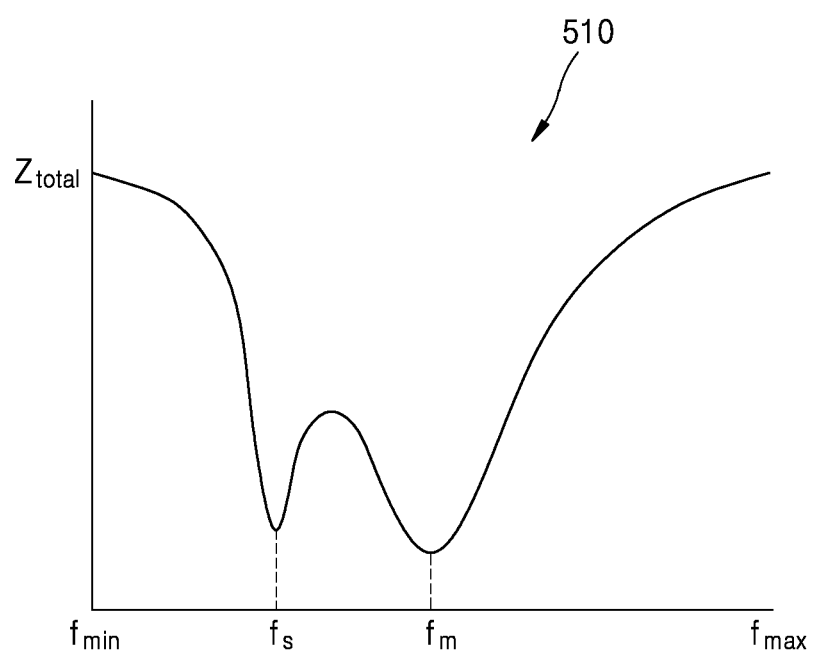
FIG. 5 is a graph showing another example of a relationship between the frequency of a voltage applied to a vibrator and the impedance of the vibrator.

FIG. 5 is a graph showing another example of a relationship between the frequency of a voltage applied to a vibrator and the impedance of the vibrator.

Referring to FIG. 5, the horizontal axis of a graph 510 indicates the frequency of a voltage applied to a vibrator, and the vertical axis indicates the impedance $Z_{total}$ of the vibrator. Also, a plurality of resonant frequencies of the vibrator are shown. The lowest impedance corresponds to a main resonant frequency $f_m$ of the vibrator, and the second lowest impedance corresponds to a sub-resonant frequency $f_s$ of the vibrator.

The vibration frequency of the vibrator may be changed based on the frequency of an applied voltage. For example, the vibrator may vibrate at the highest vibration frequency when the voltage has the main resonant frequency $f_m$ and may vibrate at lower vibration frequencies when the voltage has other frequencies. The vibrator may atomize an aerosol generating material into an aerosol by vibrating at a vibration frequency based on the frequency of an applied voltage.

The processor may control the vibration frequency of the vibrator in the smoke mode to a first vibration frequency. The first vibration frequency may be a vibration frequency set to generate a sufficient amount of aerosol from an aerosol generating device. For example, the processor may determine the first vibration frequency such that the consumption of an aerosol generating material per unit time exceeds a predetermined value. The predetermined value may correspond to, for example, 1 μg per second. However, the predetermined value may be changed based on an output power of a battery, the performance of the vibrator, the characteristics of an aerosol generating material, etc. The processor may control the vibrator to vibrate at the first vibration frequency by applying a voltage of the main resonance frequency $f_m$ or a frequency between the main resonance frequency $f_m$ and a sub-resonance frequency $f_s$ to the vibrator in the smoke mode.

The processor may apply a voltage of a sub-resonant frequency $f_s$ having a lower frequency than the main resonant frequency $f_m$ at which the largest resonance occurs, to the vibrator in the smokeless mode. Thereby, the processor may control the vibration frequency of the vibrator to a second vibration frequency lower than the first vibration frequency. In other words, the processor may reduce the vibration frequency of the vibrator in the smokeless mode as compared to the smoke mode by applying a voltage of a sub-resonant frequency $f_s$ to the vibrator.

The impedance at a sub-resonant frequency $f_s$ is only slightly higher than that at the main resonant frequency $f_m$ and is relatively low as compared to those at other frequencies. On the other hand, a frequency difference between a sub-resonant frequency $f_s$ and the main resonant frequency $f_m$ is relatively large. Therefore, at a sub-resonant frequency $f_s$, an increase in heat generation or decrease in kinetic energy due to the increased impedance is relatively small, while a change in vibration frequency of the vibrator is relatively large, as compared to a main resonant frequency $f_m$.

The vibration frequency of the vibrator and the particle size of an atomized aerosol may have an inverse correlation. For example, as the vibration frequency increases, the number of vibrations per unit time increases. Therefore, the number of times of splitting an aerosol generating material into particles increases, and particles already split may be split again more frequently. On the contrary, as the vibration frequency decreases, the number of times of splitting the aerosol generating material into particles decreases, and it is relatively rare that particles already split are split again.

Accordingly, the particle size of an aerosol may increase as the vibration frequency of the vibrator decreases. The vibrator may vibrate at the second vibration frequency in the smokeless mode to generate an aerosol having a larger particle size than in the smokeless mode in which the vibrator vibrates at the first vibration frequency. As an aerosol with relatively large particle size is generated in the smokeless mode, the atomization amount may be reduced. A relationship between the particle size of an aerosol and the atomization amount will be described later with reference to FIGS. 6 and 7. The particle size of an aerosol, that is, the diameter or the longest measured length, may be greater than 2 µm and smaller than or equal to 10 µm in the smokeless mode and may be larger than or equal to 0.2 µm and smaller than or equal to 2 µm in the smoke mode. However, the numerical values regarding the particle size of an aerosol are only examples and may vary depending on the characteristics of an aerosol generating material, the performance of the vibrator, the output power of the battery, etc.

Figure 6:
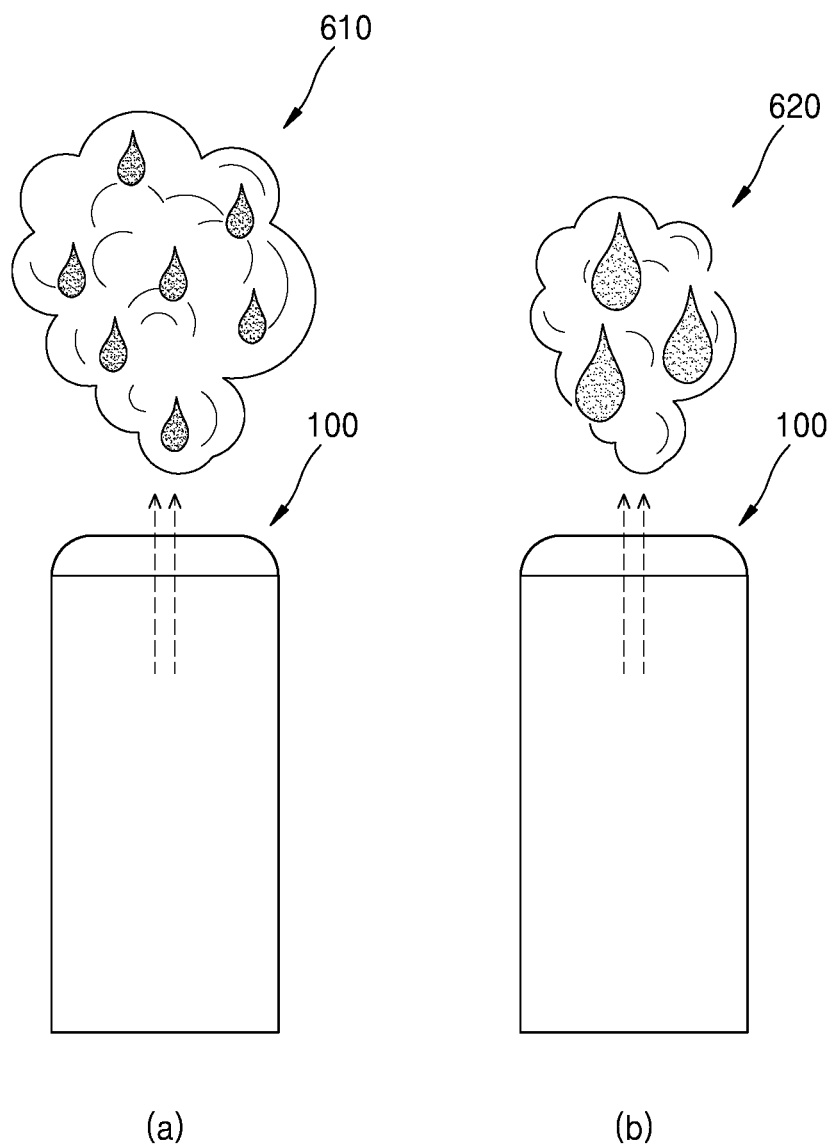
FIG. 6 is a diagram for describing a relationship between a particle size and an atomization amount of an aerosol.

FIG. 6 is a diagram for describing a relationship between a particle size and an atomization amount of an aerosol.

Referring to FIG. 6, FIG. 6A shows that the particle size of an aerosol 610 is small and the atomization amount thereof is relatively large, and FIG. 6B shows that the particle size of an aerosol 620 is large and the atomization amount thereof is relatively small. The particle size of an aerosol may refer to an average size of particles included in the aerosol. Here, the particle size may refer to a mass or a volume of a particle.

As described above with reference to FIGS. 3 to 5, when the viscosity of an aerosol generating material is low or the vibration frequency of the vibrator is high, the particle size of an atomized aerosol may be reduced. Also, when the viscosity of the aerosol generating material is high or the vibration frequency of the vibrator is low, the particle size of an atomized aerosol may be increased.

Figure 7:
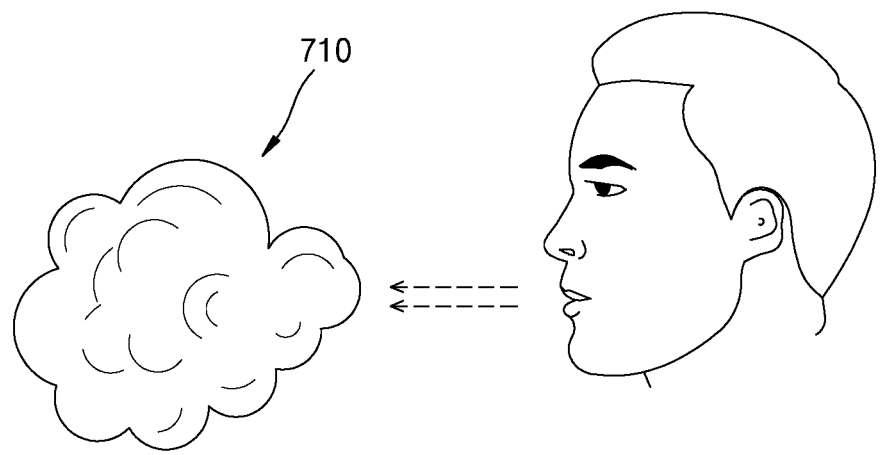
FIG. 7 is a diagram showing an example in which the aerosol generating device of FIG. 6 is used.
Figure 7:
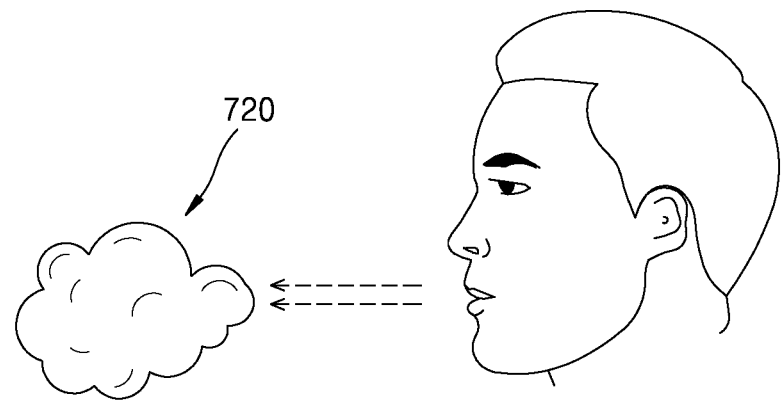

With the same amount of atomized aerosol generating material (or the mass of an aerosol), an atomization amount may vary depending on the particle size of the aerosol. In FIGS. 6 and 7, the atomization amount may refer to the volume of an aerosol or the volume of visible smoke, not the mass of the aerosol. In other words, the same amount of atomized (or vaporized) aerosol generating material may form a different amount of smoke that is visually recognizable.

When the total mass of an aerosol is the same, the total number of particles constituting the aerosol increases as the particle size of the aerosol decreases. Since particles constituting an aerosol diffuse in the air, the greater the number of diffused particles is, the larger the volume of the aerosol or visible smoke becomes. Also, the diffusion rate increases as the mass of the particles decreases. Therefore, as the particle size of an aerosol decreases, the number of diffused particles and the diffusion rate of the particles increase, and thus the atomization amount may increase.

On the contrary, as the particle size of an aerosol increases, the total number of particles constituting the aerosol decreases, and the number of diffused particles decreases. Also, since the mass of each particle increases, the diffusion rate of the particles decreases. Therefore, the atomization amount may decrease. As shown in FIG. 6A, the processor may increase the atomization amount by reducing the particle size of the aerosol 610. In this case, the aerosol generating device 100 may operate in the smoke mode. As shown in FIG. 6B, the processor may decrease the atomization amount by increasing the particle size of the aerosol 620. In this case, the aerosol generating device 100 may operate in the smokeless mode.

FIG. 7 is a diagram showing an example in which the aerosol generating device of FIG. 6 is used.

FIG. 7A shows an example in which the aerosol generating device 100 shown in FIG. 6A is used, and FIG. 7B shows an example in which the aerosol generating device 100 shown in FIG. 6B is used.

As the atomization amount of an aerosol generated from the aerosol generating device changes, the volume of the aerosol or visible smoke puffed by a user using the aerosol generating device may change. Referring to FIG. 7A, when the atomization amount of the aerosol 610 generated from the aerosol generating device 100 is increased as in FIG. 6A, the volume of an aerosol 710 discharged from the user is also increased. In this case, the aerosol generating device may operate in the smoke mode. On the contrary, referring to FIG. 7B, when the atomization amount of the aerosol 620 generated from the aerosol generating device 100 is decreased as in FIG. 6B, the volume of an aerosol 720 puffed by the user is also decreased. In this case, the aerosol generating device may operate in the smokeless mode.

Meanwhile, even when the same volume of an aerosol is generated from the aerosol generating device, an amount or volume of an aerosol puffed by the user may differ according to the aerosol particle size. For example, when the particle size of the aerosol is relatively large, the amount or volume of an aerosol puffed by the user may be reduced as compared to the case where the particle size is relatively small. Therefore, as shown in FIG. 7B, the processor may decrease the atomization amount by increasing the particle size of the aerosol 720. In this case, the aerosol generating device may operate in the smokeless mode.

Meanwhile, the aerosol generating device may include a user interface (not shown), and the user interface may correspond to the user interface of FIG. 1. The user interface may receive a user input.

In an embodiment, the user interface may include a button. For example, one of the smoke mode or the smokeless mode may be selected according to the number of times the button is pressed or an input time during which the one button is continuously pressed. Alternatively, the user interface may include a plurality of buttons which correspond to the smoke mode and the smokeless mode, respectively.

In another embodiment, the user interface may include a switch. For example, the smoke mode or the smokeless mode may be selected as the switch is operated left and right or up and down.

In another embodiment, the user interface may include a display. For example, icons corresponding to the smoke mode and the smokeless mode may be displayed on the display. The display may be a touch screen or may be operated by being electrically connected to a separate input means.

However, the above-described user interfaces and the user input methods are merely examples, and the type of the user interface and the method of receiving a user input may be variously modified.

The aerosol generating device may operate in the smoke mode or the smokeless mode in response to a user input received through the user interface. In this case, the aerosol generating device may operate in the smoke mode as in FIG. 6A or in the smokeless mode as in FIG. 6B. When the aerosol 710 puffed by the user increases as shown in FIG. 7A, a visual satisfaction may be provided to the user. When the aerosol 720 discharged from the user is reduced as shown in FIG. 7B, the aerosol generating device may provide the user the convenience of using the aerosol generating device with no restrictions on place.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating apparatus comprising:
    a liquid storage configured to accommodate an aerosol generating material;
    a vibrator configured to generate ultrasonic vibration to atomize the aerosol generating material into an aerosol; and
    a processor configured to:
        based on a correlation between frequencies within a predetermined range including a resonant frequency of the vibrator and impedances of the vibrator changed by application of the frequencies within the predetermined range, determine an operating frequency for controlling the vibrator to a second temperature higher than a first temperature reached by application of a voltage of the resonant frequency, and
        control the vibrator to the second temperature by applying a voltage of the operating frequency to the vibrator.

2. The aerosol generating device of claim 1, wherein the vibrator transfers heat generated at the second temperature to an aerosol generating material, which is moved from the liquid storage and absorbed by a liquid delivery element, such that the temperature of an absorbed aerosol generating material reaches a temperature corresponding to the second temperature.

3. The aerosol generating device of claim 2, wherein
    a viscosity of the absorbed aerosol generating material decreases as a temperature of the absorbed aerosol generating material increases, and
    the vibrator is further configured to
        atomize the aerosol generating material having a reduced viscosity as the aerosol generating material is controlled to the second temperature as compared to the case where the vibrator is controlled to the first temperature, and
        generate a greater amount of aerosol per unit time from the aerosol generating material having the reduced viscosity as compared to the case where the vibrator is controlled to the first temperature.

4. The aerosol generating device of claim 3, wherein, as the vibrator is controlled to the second temperature, the impedance of the vibrator increases as compared to the case where the vibrator is controlled to the first temperature, and
    when an amount of an aerosol generated for a unit time is increased by a first value due to the temperature of the vibrator increased in correspondence to the increased impedance of the vibrator and an amount of aerosol generated for the unit time is decreased by a second value due to the vibration energy of the vibrator decreased in correspondence to the increased impedance of the vibrator, the processor determines the second temperature, such that the first value exceeds the second value.

5. The aerosol generating device of claim 3, wherein a particle size of an aerosol atomized from the aerosol generating material having the reduced viscosity is 0.2 μm to 2 μm.

6. The aerosol generating device of claim 2, wherein
    the processor determines the second temperature, such that the aerosol whose temperature changes in correspondence to the temperature of the absorbed aerosol generating material is higher than or equal to 45° C. at a discharge hole for discharging the aerosol to the outside, and the vibrator transfers heat to the absorbed aerosol generating material, such that the temperature of the aerosol at the discharge hole is higher than or equal to 45° C.

7. The aerosol generating device of claim 6, wherein the vibrator vibrates at a vibration amplitude corresponding to a magnitude of an applied voltage, and the processor reduces a magnitude of a voltage applied to the vibrator and the amplitude of the vibrator as compared to those in a smoke mode in which visible smoke is produced from the aerosol generating device, such that the aerosol generating device operates in a smokeless mode in which no visible smoke is produced.

8. The aerosol generating device of claim 7, wherein the processor determines the magnitude of the voltage applied to the vibrator, such that consumption of the aerosol generating material per unit time is less than or equal to a predetermined value in the smokeless mode, and the vibrator atomizes the aerosol generating material of an amount less than the predetermined value for a unit time by vibrating at an amplitude corresponding to the determined magnitude of the voltage.

* * * * *